(No Model.)
C. H. GERRARD.
PLOW.
No. 493,080. Patented Mar. 7, 1893.
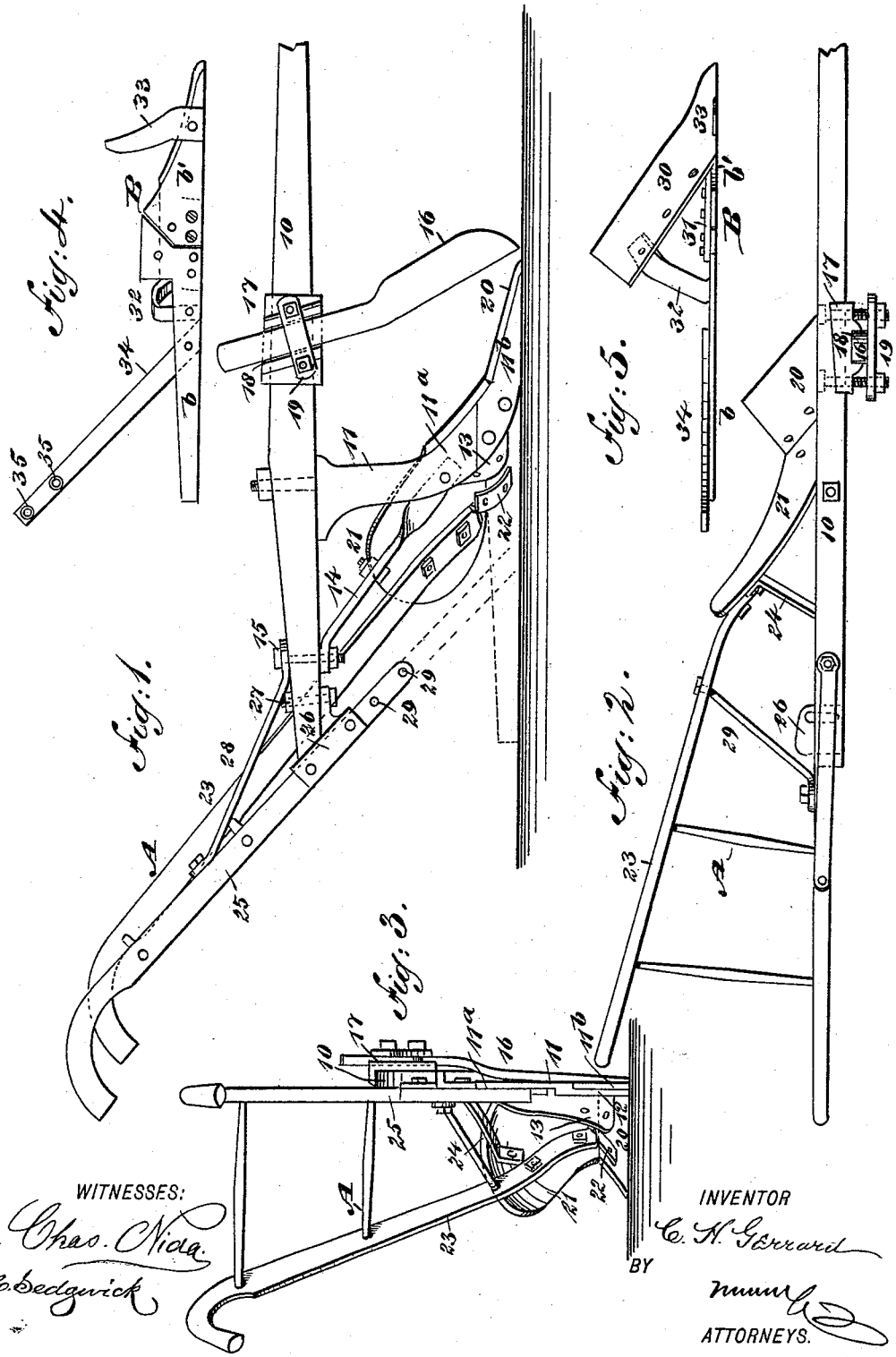

UNITED STATES PATENT OFFICE.

CHARLES H. GERRARD, OF XENIA, ILLINOIS.

PLOW.

SPECIFICATION forming part of Letters Patent No. 493,080, dated March 7, 1893.

Application filed July 8, 1892. Serial No. 439,351. (No model.)

*To all whom it may concern:*

Be it known that I, CHARLES H. GERRARD, of Xenia, in the county of Clay and State of Illinois, have invented a new and useful Improvement in Plows, of which the following is a full, clear, and exact description.

My invention relates to an improvement in plows, and has for its object to so construct the beam, the shank and the handles that plow shares of different character, adapted to be used in connection with different kinds of soil, may be expeditiously and conveniently attached to the beam and shank: and the invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1 is a side elevation of the plow, the plow-share attached thereto being a slip share, and the plow adapted for use as a grub plow. Fig. 2 is a plan view of the plow shown in Fig. 1. Fig. 3 is a rear elevation thereof. Fig. 4 is a side elevation of a share adapted for use upon old ground, said share being provided with a landside and an attached colter; and Fig. 5 is a plan view of the share shown in Fig. 4.

The plow beam 10 may be of any suitable or approved construction. A shank 11 is secured to the beam, and the said shank is curved downward and forward, and the shank is constructed in two sections, namely, an upper section 11ª and a lower section 11ᵇ. The connection between the two sections is effected near the bottom of the shank, or where the shank is decidedly forwardly curved; and the upper section 11ª of the shank at its lower end is provided with a depression or socket 12, in which the lower section 11ᵇ, is entered and secured by bolts or otherwise; and when the two sections of the shank are connected, the land sides of the two sections are perfectly flush. The upper section or portion 11ª of the shank is somewhat V-shaped or U-shaped in cross section; and one member of the shank at its lower end, that is the member located upon the share side of the plow, is made quite wide, and is given the sweep usually given to a mold board. This extension of the shank is designated in the drawings as 13, and is clearly shown in Figs. 1 and 3.

A brace 14, is connected with the bottom of the plow beam 10, near the rear end thereof, and the connection between the beam and the brace is an adjustable one, as the brace is provided with an upper elongated slot through which a bolt 15, is passed, the bolt passing also through the beam. The lower end of this brace 14, is secured by a bolt or the equivalent thereof to the inner face of the land side member of the outer section 11ª of the shank.

In front of the shank 11 a colter 16, is secured to the beam; the colter is attached in an adjustable manner, and the means of attachment consist in securing upon the land side of the beam a block 17, in which a diagonal slide-way 18, is produced, and in this slide-way the upper end of the colter is located and clamped to the block, when the colter is to be held fast, by means of a clip 19, or any equivalent of said clip.

The share 20, when a slip share is to be employed, is fastened to the upper edge of the lower section 11ᵇ of the shank, and constitutes a portion of that section, the share being bolted upon its front face to the extension member 13 of the body of the shank in order that the share may be held stationary and in rigid connection with the shank. The mold board 21, at its upper edge, rests flush upon the upper edge of the share, and the mold board is attached by bolts, rivets or otherwise to the upper section of the shank 11, and is adapted to remain at all times a portion of the shank, the share only being adapted to effect a change in the character of the plow. The mold board and the share are connected by means of a strap 22, located at the back, as shown in both Figs. 1 and 3.

One member 23 of the handle A, is bolted to the inner face of the mold board, and the mold board is connected also by a transverse brace 24 with the vertical brace 14, connecting the shank and the beam. The other member 25 of the handle A, is shorter than its opposite member, and this handle is provided above its lower end with an attached plate 26, the said plate being adapted to extend beneath the lower portion of the beam 10, and an adjustable connection is effected between the plate and the beam, as illustrated in Figs. 1 and 2, by means of a bolt 27, passed through an elongated slot in the plate and through the beam. As the connection between the plate 26 is an adjustable one, the clevis end of the plow beam may be carried in direction of the right or of the left of the plow as desired; that is, the brace 28, which connects the short member 25 of the handle with the beam in order to strengthen it; the lower extremity of the shorter member of the handle extends downward a little distance below the beam, and is provided with apertures 29, as illustrated in Fig. 1.

In Figs. 4 and 5 I have shown a share attached as a substitute for the slip share 20, and used in tilling certain kinds of ground. This share 30, is provided with a land-side B, and this land-side may be solid, that is in one piece, or it may be made in two sections $b$ and $b'$, as illustrated in Fig. 4, and when so constructed the sections are connected by a tie-plate 31; the land side is adapted to extend some distance beyond the rear end of the share, and the outer end of the share and the land side are united by an arched brace 32. The share is secured to the upper face of the forward section of the land side, as shown in both Figs. 4 and 5; and if in practice it is found desirable a colter blade 33, may be secured in a recess in the forward portion of the land side near its point, the colter blade being made to extend upward virtually in a vertical manner. The rear portion of the land side has secured thereto a connecting bar 34, rearwardly-inclined, and this bar is provided with apertures 35.

In effecting a change in the plow the lower shank section $11^b$ and the share 20, are removed from the shank; the forward section $b'$ of the land-side of the share 30, is then made to take the place of the lower section of the shank and is secured to the upper portion of the latter, while the share 30, is bolted or riveted, preferably the former, to the extension 13 of the shank, and the connecting rod or bar 34 is connected by means of bolts with the lower portion of the shorter member of the handle A, the bolts effecting the connection being passed through the apertures 29 in the handle and the openings 35 in the connecting rod or bar. The colter 16, may be removed, if desired, or may be carried upward out of the way.

This plow is exceedingly simple, it is durable and it is economic, and the share, as is evident from the foregoing description, may be changed expeditiously and conveniently to suit the character of the land to be tilled.

Having thus described my invention, I claim as new and desire to secure by Letters Patent—

1. In a plow the combination with the beam, and its handles; the land side handle extending below the beam and provided with apertures 29, the brace 28 extending from handle 25 to the beam, the brace 14 below the beam and the bolt 15 connecting both braces to the beam, of the standard 11, having a recess 12 in the outer face of its lower end, whereby either of the two shares may be used, substantially as set forth.

2. The combination with the share 30 and its side B formed in two sections $b$ $b'$ having a plate 31 bolted to them and securing them together, of the brace 32 connecting the share 30 and the section $b$ and the upwardly and rearwardly inclined brace 34 secured at its lower end to the section $b$ and having two apertures 35 at its upper end to register with similar apertures 29 of a handle extension, substantially as set forth.

CHARLES H. GERRARD.

Witnesses:
A. H. PORTER,
A. B. BRIDGES.